(12) United States Patent
Dave et al.

(10) Patent No.: US 7,579,100 B2
(45) Date of Patent: Aug. 25, 2009

(54) FUEL STACK ASSEMBLY

(75) Inventors: Nileshkumar T. Dave, West Hartford, CT (US); Bryan Dufner, West Hartford, CT (US); Carl Reiser, Stonington, CT (US)

(73) Assignee: UTC Power Corporation, South Windsor, CT (US)

( * ) Notice: Subject to any disclaimer, the term of this patent is extended or adjusted under 35 U.S.C. 154(b) by 844 days.

(21) Appl. No.: 10/325,237

(22) Filed: Dec. 20, 2002

(65) Prior Publication Data

US 2004/0121212 A1 Jun. 24, 2004

(51) Int. Cl.
*H01M 8/04* (2006.01)

(52) U.S. Cl. .......................................... 429/32; 429/34
(58) Field of Classification Search .................. 429/32, 429/34
See application file for complete search history.

(56) References Cited

U.S. PATENT DOCUMENTS

2001/0036567 A1* 11/2001 Gyoten et al. .................. 429/26
2003/0064269 A1* 4/2003 Kelly et al. .................... 429/34

* cited by examiner

*Primary Examiner*—John S Maples
(74) *Attorney, Agent, or Firm*—Bachman & LaPointe, P.C.

(57) ABSTRACT

A fuel cell stack assembly includes a plurality of substantially uniform fuel cell components arranged in a stack and including end components; and pressure/end plate current collectors positioned adjacent to the end components.

7 Claims, 3 Drawing Sheets

Proposed change to show subject matter of claim 9.

FUEL STACK ASSEMBLY

BACKGROUND OF THE INVENTION

The invention relates to an improved fuel cell stack assembly.

Fuel cell stack assemblies are typically a plurality of fuel cell components arranged in a stack and held together by pressure plates. FIG. 1 shows a typical conventional fuel cell stack assembly, and shows a single fuel cell component 1 in a center portion of the stack including a cathode water transfer plate (WTP) 1a and an anode and cooler plate 1b. On either side of this component are unitized electrode assemblies (UEA) 2, and this sequence is repeated through the stack until the end plate assembly 3 which, in conventional fuel cell assemblies, requires a unique water transfer plate and a non-porous graphite plate 4. End/pressure plates 5 are as shown. The end-plate water transfer plate interface further features coolant channels bonded by the non-porous graphite plate 4.

This configuration poses several problems, including additional cost and design complexity due to the unique components required for the end of the stack. Further, the non-porous graphite bonded to the WTP causes additional structural complexity since this material has a different modulus than the remainder of the repeating components. Further, corrosion protection complexity at the current collector interface is increased due to having an unknown environment near the current collector. Due to the solid graphite plate, it is never clear whether the environment is hydrogen, air or water.

It is clear that the need remains for improved fuel cell assembly structures to address the aforesaid problems.

It is therefore the primary object of the present invention to provide an improved fuel cell stack assembly wherein unique end cell assemblies are avoided.

It is a further object of the invention to provide such an assembly wherein the environment adjacent to the current collector is known.

Other objects and advantages of the present invention will appear hereinbelow.

SUMMARY OF THE INVENTION

In accordance with the present invention, the foregoing objects and advantages of the present invention have been readily attained.

According to the invention, a fuel cell stack assembly is provided which comprises a plurality of substantially uniform fuel cell components arranged in a stack and including end components; and pressure/end plate current collectors positioned adjacent to said end components.

BRIEF DESCRIPTION OF THE DRAWINGS

A detailed description of preferred embodiments of the present invention follows, with reference to the attached drawings, wherein.

DETAILED DESCRIPTION

The invention relates to a fuel cell stack assembly 10 which is advantageously provided having unique repeating structures throughout the stack, advantageously including endplate structures adjacent to current collectors, whereby the structure is greatly simplified, cost and complexity of manufacturing are reduced, modulus of expansion issues are simplified due to similar materials throughout the stack, and corrosion issues in connection with the end plates are reduced due to a known environment adjacent to end plate current collectors.

Figure 2:
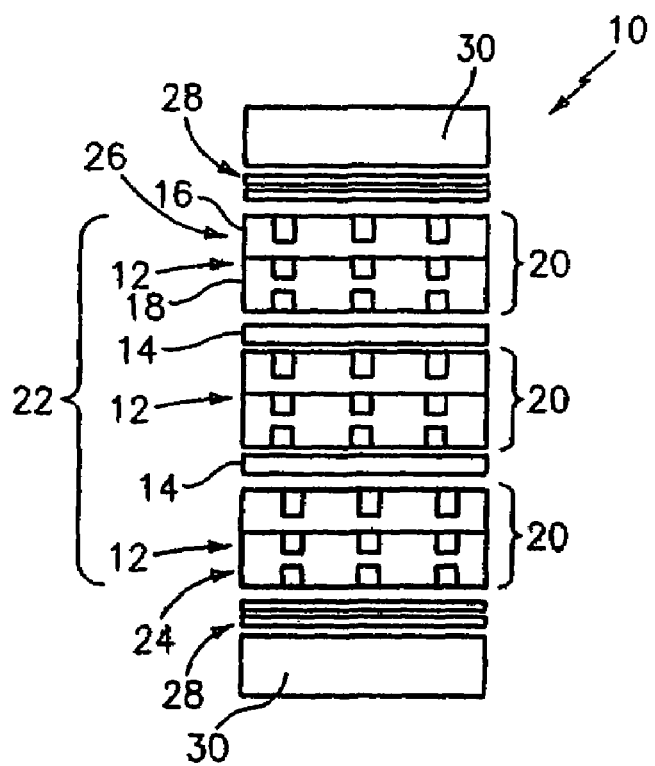
FIG. 2 illustrates an improved fuel cell stack assembly in accordance with the present invention.

FIG. 2 shows a fuel cell stack assembly 10 in accordance with the present invention, including three substantially uniform fuel cell components 12 each of which is separated by a likewise substantially uniform unitized electrode assembly 14. Fuel cell components 12 preferably include a cathode water transfer plate (WTP) 16, and an anode and cooler plate portion 18, each having channels for flow of fuel, oxidant and/or coolant as desired. Each component 12 collectively forms a separate water transfer plate assembly schematically illustrated at 20. Components 12 with unitized electrode assemblies 14 collectively define the repeating elements of a fuel cell stack assembly 10. FIG. 2 shows a cell repeating element assembly 22 having only 3 fuel cell components 12, for simplicity, and end components are also indicated at 24 and 26. It should be appreciated that cell repeating element assembly 22 may have additional components 12, each substantially identical to those illustrated.

As is well known to a person of ordinary skill in the art, pressure/end plate current collectors 30 must be provided for collecting current generated throughout cell stack assembly 10. Such current collectors are typically positioned adjacent end components of the stack, and in the prior art configuration of FIG. 1 are positioned adjacent to solid graphite plates 4, which leads to the aforesaid disadvantages.

Figure 1:
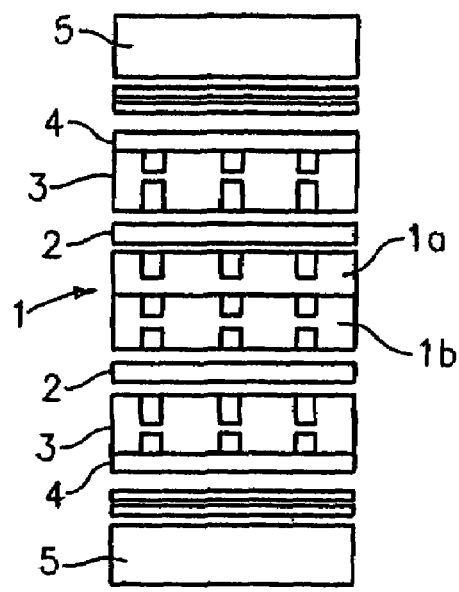
FIG. 1 illustrates a prior art fuel cell stack assembly.

In accordance with the present invention, pressure/end plate current collectors 30 are advantageously positioned adjacent to end compliance components 28 which provide compliance between cell repeating element assembly 22 and the pressure/end plate current collector 30 without the need for a special transition end plate assembly as shown in FIG. 1.

Thus, assembly 10 in accordance with the present invention provides for simplified modulus of expansion considerations since the end cell structures are not unique to fuel cell stack assembly 10. Further, the end compliance components 28 are made of porous material as in other components 12 of fuel cell stack assembly 10 and therefore provide for a known environment (either reactant or oxidant) in the portion of end compliance components 28 which abut pressure/end plate current collectors 30, thereby providing for a known environment which can readily be addressed in connection with corrosion issues.

In further accordance with the present invention, end compliance components 28 may comprise a variety of potentially different structures. For example, compliance components 28 may be provided as a graphitic substrate, preferably having impregnated edge seals for maintaining seals within fuel cell stack assembly 10 as desired.

Alternatively, compliance components 28 may be provided having a conductive polymer cushion, preferably one or more polymer cushions having a gas permeability less than a value which would allow reactant leakage, but nevertheless greater than or equal to a value sufficient to provide a known environment at an interface between compliance component 28 and end plate current collector 30. In accordance with a still further embodiment of the present invention, compliance components 28 may be provided with a fine particle size layer of graphite, or graphite particles, between end plate collector 30 and fuel cell components 12.

In accordance with still another alternative embodiment of the present invention, compliance components 28 may be provided as a graphite substrate, having an external seal gasket, which is adapted to receive the graphite substrate in a nested configuration defining a seal with the external seal gasket.

Figure 2A:
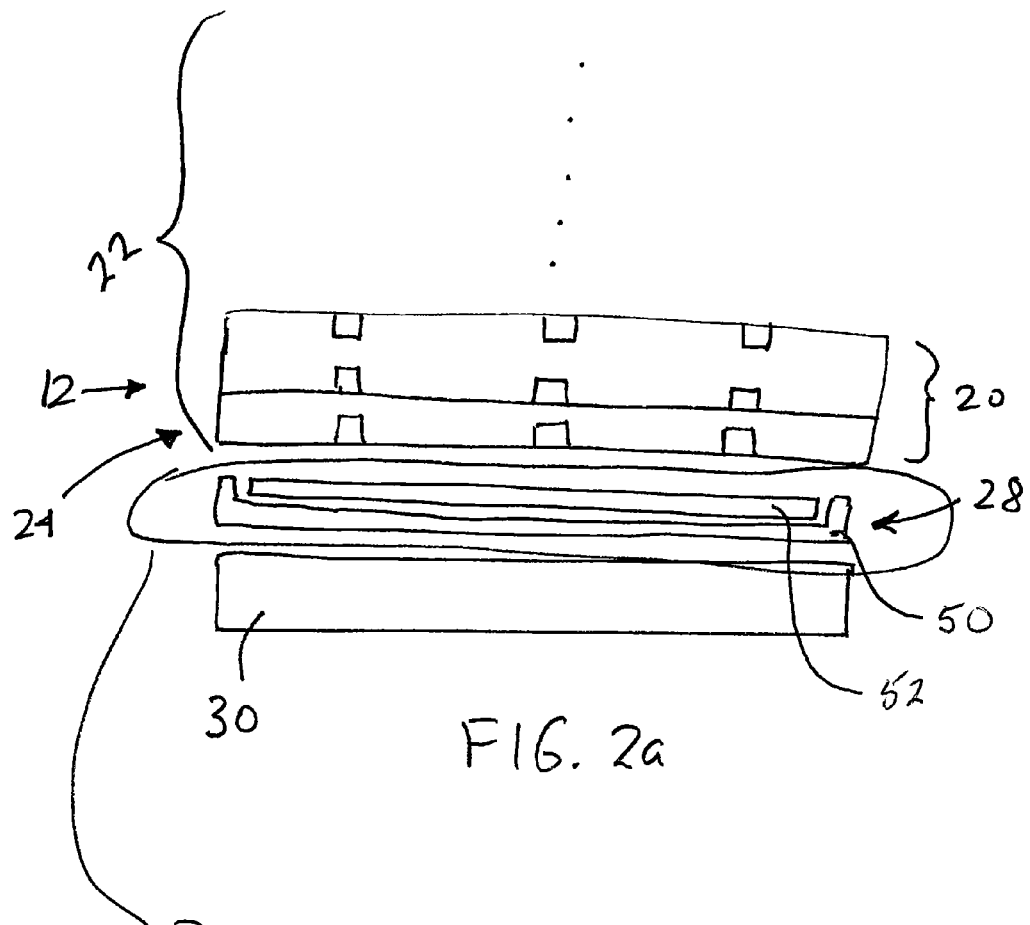
FIG. 2a illustrates an alternative embodiment of the invention with a graphite substrate nested in an external seal gasket.

FIG. 2a shows an alternative embodiment of the invention as discussed above, wherein a graphite substrate 52 is nested in an external seal gasket 50.

Figure 2B:
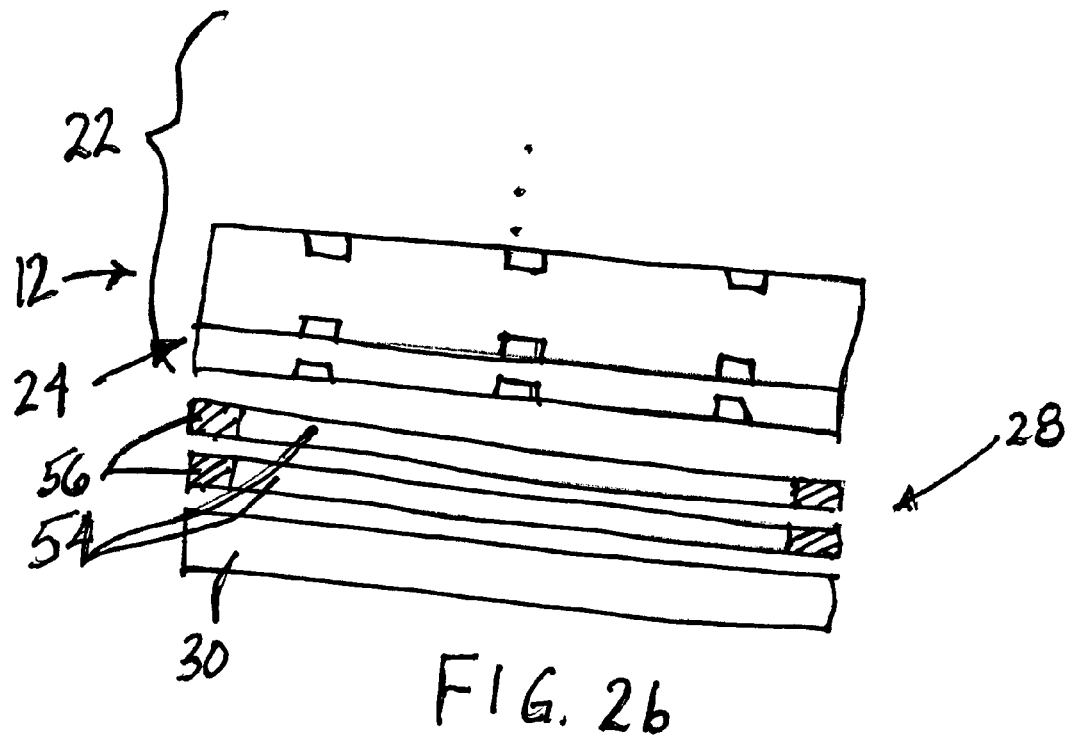
FIG. 2b illustrates an alternative embodiment of the invention having a graphitic substrate with impregnated edge seal.

FIG. 2b shows an alternative embodiment of the invention as discussed above, wherein the compliance components 28 comprise a graphitic substrate 54 having impregnated edge seal 56.

Figure 2C:
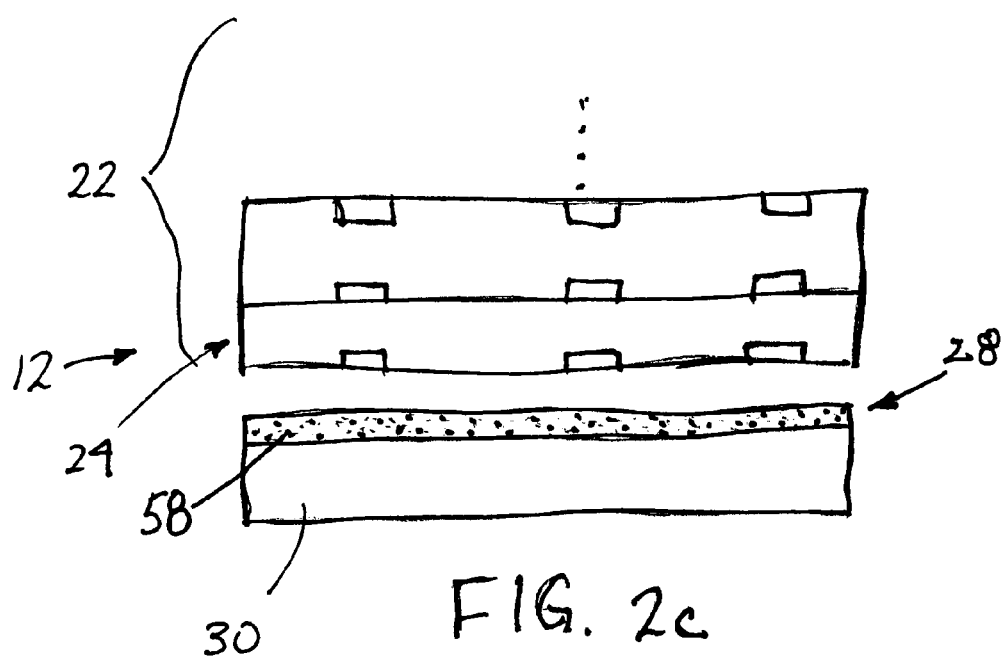
FIG. 2c illustrates an alternative embodiment of the invention having a layer of graphite particles on the current collector.

FIG. 2c shows an alternative embodiment of the invention as discussed above, wherein the compliance components 28 comprise a layer 58 of graphite particles deposited on the current collector 30.

The specific details of operation of a fuel cell stack assembly as illustrated in FIGS. 1 and 2, as well as additional details with reference to particular aspects of each component 12, 14 thereof, are well known to a person of ordinary skill in the art and are not further described herein.

In accordance with the present invention, it should readily be appreciated that an improved fuel cell stack assembly has been provided, wherein substantially uniform components for fuel cell stack assembly 10 are utilized, thereby greatly simplifying manufacturing costs, design issues and the like. Further, because compliance components 28, as with other fuel cell components 12, are provided of porous material, preferably having porous graphite surfaces, some reactant material from cells or components 12 is allowed to contact end plate collectors 30, thereby providing a known environment and simplifying corrosion issues.

Still further, the assembly 10 in accordance with the present invention further avoids excessive complexity in connection with modulus of expansion of differing materials, which is an improvement over existing structures as well.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A fuel cell stack assembly, comprising:
   a plurality of substantially uniform fuel cell components arranged in a stack and including end components; and
   a pressure/end plate assembly comprising current collectors and compliance components, wherein the compliance components are positioned adjacent to said end components, and wherein the current collectors are positioned adjacent to the compliance components, wherein each of said substantially uniform fuel cell components including said end components comprises a cathode water transfer plate and an anode plate.

2. The assembly of claim 1, further comprising substantially uniform unitized electrode assemblies positioned between said substantially uniform fuel cell components.

3. The assembly of claim 1, wherein said compliance components comprise a graphitic substrate having impregnated edge seals.

4. The assembly of claim 1, wherein said compliance components comprise a conductive polymer cushion.

5. The assembly of claim 4, wherein said polymer cushion has gas permeability less than a value which would allow reactant leakage and greater than or equal to a value sufficient to provide a known environment at said pressure/end plate current collector.

6. The assembly of claim 1, wherein said compliance components comprise a layer of graphite particles on said pressure/end plate current collector.

7. A fuel cell stack assembly, comprising:
   a plurality of substantially uniform fuel cell components arranged in a stack and including end components; and
   pressure/end plate current collectors positioned adjacent to said end components, further comprising compliance components between said end components and said pressure/end plate current collectors, wherein said compliance components comprise a graphite substrate and an external seal gasket, and wherein said graphite substrate is nested in said external seal gasket.

* * * * *

UNITED STATES PATENT AND TRADEMARK OFFICE
CERTIFICATE OF CORRECTION

PATENT NO.       : 7,579,100 B2                                        Page 1 of 1
APPLICATION NO. : 10/325237
DATED            : August 25, 2009
INVENTOR(S)      : Dave et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1071 days.

Signed and Sealed this

Fourteenth Day of September, 2010

David J. Kappos
*Director of the United States Patent and Trademark Office*